US012799266B2

(12) United States Patent
Chen et al.

(10) Patent No.: US 12,799,266 B2
(45) Date of Patent: Nov. 17, 2026

(54) MICHAEL ADDITION CURABLE COMPOSITION, COATING COMPOSITION CONTAINING THE SAME, AND COATED ARTICLE MADE THEREFROM

(71) Applicant: Sherwin-Wiliams (Guangdong) New Material Co., Ltd., Foshan City (CN)

(72) Inventors: Hongbin Chen, Foshan City (CN); Song Niu, Foshan City (CN)

(73) Assignee: SHERWIN-WILLIAMS (GUANGDONG) NEW MATERIAL CO., LTD., Guangdong (CN)

( * ) Notice: Subject to any disclaimer, the term of this patent is extended or adjusted under 35 U.S.C. 154(b) by 869 days.

(21) Appl. No.: 18/245,473

(22) PCT Filed: Sep. 16, 2021

(86) PCT No.: PCT/CN2021/118794
§ 371 (c)(1),
(2) Date: Mar. 15, 2023

(87) PCT Pub. No.: WO2022/063031
PCT Pub. Date: Mar. 31, 2022

(65) Prior Publication Data
US 2023/0357487 A1 Nov. 9, 2023

(30) Foreign Application Priority Data
Sep. 25, 2020 (CN) ........................ 202011023141.7

(51) Int. Cl.

| | |
|---|---|
| ***C08G 59/24*** | (2006.01) |
| ***C08F 222/10*** | (2006.01) |
| ***C08G 12/12*** | (2006.01) |
| ***C08K 3/36*** | (2006.01) |
| ***C08K 9/06*** | (2006.01) |
| ***C08K 9/08*** | (2006.01) |
| ***C09D 4/06*** | (2006.01) |
| ***C09D 163/04*** | (2006.01) |

(52) U.S. Cl.
CPC ........ *C08G 59/245* (2013.01); *C08F 222/102* (2020.02); *C08F 222/1061* (2020.02); *C08G 12/12* (2013.01); *C08K 3/36* (2013.01); *C08K 9/06* (2013.01); *C08K 9/08* (2013.01); *C09D 4/06* (2013.01); *C09D 163/04* (2013.01); *C08G 2150/00* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 4,408,018 A | 10/1983 | Bartman et al. | |
| 4,602,061 A | 7/1986 | Akkerman | |
| 4,766,177 A | 8/1988 | Miller et al. | |
| 4,871,822 A | 10/1989 | Brindopke et al. | |
| 5,017,649 A | 5/1991 | Clemens | |
| 5,132,367 A | 7/1992 | Chan | |
| 5,459,178 A | 10/1995 | Chan et al. | |
| 5,567,761 A | 10/1996 | Song | |
| 6,562,918 B1 * | 5/2003 | Minami ................. | C08F 10/00 502/103 |
| 7,041,749 B2 | 5/2006 | Dammann et al. | |
| 7,799,943 B2 | 9/2010 | Shah et al. | |
| 7,951,869 B2 | 5/2011 | Funston | |
| 2003/0129421 A1 | 7/2003 | Terauchi et al. | |
| 2008/0145564 A1 | 6/2008 | Allam et al. | |
| 2009/0078156 A1 * | 3/2009 | Chasser ............... | C08G 59/184 524/188 |
| 2011/0124795 A1 | 5/2011 | Van De Zande et al. | |
| 2013/0018127 A1 | 1/2013 | Mestach et al. | |
| 2016/0096142 A1 | 4/2016 | Harris et al. | |
| 2016/0115344 A1 | 4/2016 | Brinkhuis et al. | |
| 2016/0168320 A1 | 6/2016 | Brinkhuis et al. | |

(Continued)

FOREIGN PATENT DOCUMENTS

| | | |
|---|---|---|
| CN | 102030340 A * | 4/2011 |
| CN | 103210008 A | 7/2013 |
| CN | 109074671 A | 12/2018 |

(Continued)

OTHER PUBLICATIONS

English Machine Translation of CN_102030340_A (Year: 2025).*
MCM-41 Silica Sigma Aldrich (Year: 2026).*
International Search Report from PCT application serial No. PCT/CN2021/118794 dated Dec. 22, 2021.
Zhou Wenying et al., Thermally Conductive Polymer Materials, 1st ed, Apr. 30, 2014, Beijing: National Defense Industry Press pp. 90, 91.
Ing Weiyong et al., Production Technology of Major Products of Carbon One Chemical, 1st Edition, Mar. 31, 2004 Beijing: Chemical Industry Press pp. 243, 244.
Feng Xiaofeng et al., Materials Development and Applications, vol. 33, No. 02, Apr. 30, 2018, Preparation of a mussel-inspired zwitterionic nano-silica antifouling coating, pp. 33-37.

(Continued)

*Primary Examiner* — Randy P Gulakowski
*Assistant Examiner* — Holley Grace Hester
(74) *Attorney, Agent, or Firm* — Tucker Ellis LLP

(57) ABSTRACT

The present disclosure relates to a Michael Addition curable composition, coating composition containing the same and coated article made therefrom. In particular, the Michael Addition curable composition, comprises A) at least one reactive donor capable of providing two or more nucleophilic carbanions; B) at least one reactive acceptor comprising two or more carbon-carbon double bonds; C) at least one catalyst for catalyzing the Michael Addition crosslinking reaction between the reactive donor and the reactive acceptor; and D) at least one hardness improver, wherein the at least one reactive donor has a backbone based on an epoxy resin; and wherein the at least one hardness modifier is one or more selected from silica and urea formaldehyde resin, and the at least one hardness modifier has a particle size in micrometers and the at least one hardness modifier has a pH value of 6.5 or higher.

19 Claims, No Drawings

(56) References Cited

U.S. PATENT DOCUMENTS

2025/0277074 A1* 9/2025 Lindquist ................. C09D 5/08

FOREIGN PATENT DOCUMENTS

| | | | |
|---|---|---|---|
| CN | 110105799 | A | 8/2019 |
| CN | 110240821 | A | 9/2019 |
| EP | 0227454 | A2 | 7/1987 |
| EP | 0156210 | B1 | 6/1990 |
| EP | 0326723 | B1 | 3/1993 |
| EP | 0199087 | B2 | 11/1993 |
| EP | 1813630 | A2 | 8/2007 |
| GB | 848678 | A | 9/1960 |
| JP | 2004123766 | A | 4/2004 |
| JP | 2010120991 | A | 6/2010 |
| WO | 2005121595 | A2 | 12/2005 |
| WO | 2006024669 | A1 | 3/2006 |
| WO | 2006065369 | A2 | 6/2006 |
| WO | 2008080908 | A2 | 7/2008 |
| WO | 2010040844 | A1 | 4/2010 |
| WO | 2011121085 | A1 | 10/2011 |
| WO | 2011124663 | A1 | 10/2011 |
| WO | 2012130817 | A1 | 10/2012 |
| WO | 2012136714 | A1 | 10/2012 |
| WO | 2012140042 | A1 | 10/2012 |
| WO | 2013050574 | A1 | 4/2013 |
| WO | 2013050622 | A1 | 4/2013 |
| WO | 2014166880 | A1 | 10/2014 |
| WO | 2016166369 | A1 | 10/2016 |
| WO | 2016166381 | A1 | 10/2016 |
| WO | 2019/217384 | A1 | 11/2019 |

OTHER PUBLICATIONS

Norbert Krause, Advances in Catalytic Enantioselective Michael Additions, Dec. 3, 2000, pp. 171-196, No. 2, Synthesis 2001, Thiene Stuttgart, New York, ISSN 0039-7881.

Daniel P. Sheng and Ismail O. Kady, "Catalysis by supported Lewis acids: An efficient method for transesterification of phosphotriesters," Jun. 24, 2009, pp. 149-152, Elsevier B.V., East Tennessee State University Johnson City, TN, USA.

* cited by examiner

MICHAEL ADDITION CURABLE COMPOSITION, COATING COMPOSITION CONTAINING THE SAME, AND COATED ARTICLE MADE THEREFROM

CROSS REFERENCE TO RELATED APPLICATIONS

This application is the National Stage filing under 35 U.S.C. 371 of International Application No. PCT/CN2021/118794 filed on Sep. 16, 2021, which claims priority to Chinese Patent Application No. 202011023141.7, entitled with "MICHAEL ADDITION CURABLE COMPOSITION, COATING COMPOSITION CONTAINING THE SAME, AND COATED ARTICLE MADE THEREFROM" and filed on Sep. 25, 2020, both of which are incorporated herein by reference in their entireties.

TECHNICAL FIELD

The present disclosure relates to a curable composition. More specifically, the present disclosure relates to a Michael Addition curable composition and its cured products, as well as a coating composition containing the composition and a coated article made therefrom.

BACKGROUND

Due to increasingly strict environmental regulations, the standards for free diisocyanates (such as toluene diisocyanate TDI) and volatile organic compound (VOC) emission in industrial applications have become more and more stringent as free TDI is extremely harmful to human body and environment protection. Therefore the technology on non-isocyanate (NICN) curing without any free TDI has gained great attention in academic and industrial fields.

Up to date, there have being several potentially curable methods by NICN in industrial applications, for example including a polycarbodiimide (PCDI) curing system, a Michael Addition curing system and so on. The PCDI curing system, however, is hardly commercialized on account of its short pot-life at this stage. The Michael Addition curing system has been widely applied in industry fields as a result of its long pot-life. Meanwhile, this Michael Addition curing system has many attractive advantages, including: (1) capable of curing at ambient temperatures, even lower temperature ; (2) very low solvent content such as VOC<250 g/l (3) very long pot-life such as a pot life of >8 hours at 23° C.; (4) excellent appearance such as gloss@60° of >90 and DOI>90; (5) capable of applying at a thick layer, such as with as a thickness of >150 μm; (6) very good chemical resistance; (7) excellent flexibility; (8) good outdoor durability; (9) free of isocyanate; formaldehyde and organotin. Thus, there has been a strong demand for this Michael Addition curing system in market.

However, such a Michael Addition curing system still suffers from some obvious challenges. Compared to traditional polyurethane curing systems, this Acure Michael addition system on the market results in much lower film hardness. Therefore, there is a need in industry for an improved Michael Addition curable system with higher film hardness.

SUMMARY

In one aspect, the present disclosure provides a Michael Addition curable composition, comprising:

A) at least one reactive donor capable of providing two or more nucleophilic carbanions;

B) at least one reactive acceptor comprising two or more carbon-carbon double bonds; and C) at least one catalyst for catalyzing the Michael Addition crosslinking reaction between the at least one reactive donor and the at least one reactive acceptor; and D) at least one hardness improver, wherein the at least one reactive donor has a backbone based on an epoxy resin; and wherein the at least one hardness improver is one or more selected from silica and urea formaldehyde resin, and the at least one hardness improver has a particle size in micrometers and the at least one hardness improver has a pH value of 6.5 or higher.

In some embodiments, the Michael Addition curable composition may be used for manufacture of coatings, adhesives, sealing agents, foaming materials, films, molded products or inks.

In another aspect, a coating composition, comprising the Michael Addition curable composition described herein is provided. Preferably, after the coating composition is applied at a wet coating thickness of 150 microns and dried at room temperature for 4 days, the resulting cured coating exhibits an increase in coating hardness of two or higher levels compared to a cured coating formed from a Michael addition-curable composition that does not contain the hardness improver under the same conditions.

In another aspect, a coated article comprising a substrate having at least one major surface; and a cured coating formed from the coating composition of the Michael Addition curable composition described herein that is directly or indirectly applied on the major surface. Preferably, the substrate comprises wood, wood composite, metal, plastic, paper, fabric, ceramic, cementitious board or any combination thereof.

In the present disclosure, it has been found that one or more of silica and urea-formaldehyde resin having a specific particle size and a specific pH value as a hardness improver to enhance the hardness of the resulting coating from a Michael addition curing system comprising at least one reactive donor and at least one reactive acceptor. Compared with the control system without the hardness improver, the resulting coating system can achieve an increase in coating hardness, especially pencil hardness of two or higher levels after cuing. Moreover, the at least one hardness improver of the Michael Addition curable composition described herein is particularly suitable for enhancing the hardness of a Michael addition curing system based on epoxy resin-based reactive donors and reactive acceptors.

The details of one or more embodiments described herein are set forth in the description below. Other features, objects, and advantages will be apparent from the description, and from the claims.

DEFINITION

As used herein, "a", "an", "the", "at least one", and "one or more" are used interchangeably. Thus, for example, a coating composition that comprises "an" additive can be interpreted to mean that the coating composition includes "one or more" additives.

Throughout what is disclosed herein, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned, as along as such components or steps do not affect the basic and novel characteristics, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "Michael Addition" refers to the nucleophilic addition of a carbanion provided by at least one reactive donor to an electrophilic conjugated system such as carbon-carbon double bond of at least one reactive acceptor. A Michael Addition reaction follows the general reaction schematic shown here:

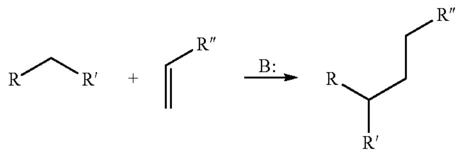

In the reaction schematic shown above, substituents R and R' on the reactive donor are electron-withdrawing groups, such as acyl and cyano groups, so that the hydrogen on methylene of the reactive donor can be deprotonated and form a carbanion in the presence of a catalyst B: and the reactive acceptors usually comprise α, β-unsaturated ketones, aldehydes, carboxylic acids, esters, nitriles, nitro and other compounds.

As used herein, the term "hardness improver" refers to a filler that can be uniformly dispersed in a Michael addition curable composition and can significantly increase hardness, especially pencil hardness (as measured according to GB/T 6739-1996 "Pencil Hardness Measurement of Coating Film") of the coating formed from the Michael addition curable composition when it is applied at a wet coating thickness of 150 microns and dried at room temperature for 4 days.

The term "particle size" in the context of "hardness improver," refers to a parameter used to measure size of the hardness improver in the form of particles. As for substantially spherical particles, the particle size is substantially equal to the average diameter of the particles. As for non-spherical particles, such as irregular, elongated, needle-like, fibrous or rod-like particles, the particle size refers to a distance between two ends along the outer periphery of the particle. In some embodiments, the particle size of the hardness improver can be measured by a laser diffraction technique using a Malvern Zetasizer.

The term "pH" in the context of "hardness improver", refers to a parameter used to measure acidity and alkalinity of the hardness improver, which is determined by uniformly dispersing the hardness improver (5% by weight) in an aqueous medium (such as water) to form an aqueous dispersion, and then measuring the pH value of the resulting aqueous dispersion several times with a pH electrode and which is determined by taking an average value. In some embodiments, the hardness improver is neutral or weakly alkaline.

The term "a skeleton based on an epoxy resin" in the context of "reactive donor", means that the skeleton structure of the reactive donor is derived from an epoxy resin and thus the reactive donor has a certain epoxy equivalent. In some embodiments, the epoxy equivalent of the reactive donor may be in the range of 400 to 1100 g/mol.

The term "Epoxy Equivalent Weight" (EEW) in the context of "reactive donor", refers to the mass of the reactive donor containing 1 mol of epoxy groups. In the case where the reactive donor is an acetoacetate functional epoxy, the epoxy equivalent refers to the mass of the acetoacetate functional epoxy containing 1 mol of epoxy groups. Generally, the lower the epoxy equivalent weight, the more epoxy groups contained in the reactive donor are, and the higher the reactivity is.

The term "nucleophilic carbanion" in the context of "a reactive donor", refers to an active intermediate of carbon with a lone pair of electrons to which two or three strong electronegative groups are attached. The strong electronegative groups may include, but not limited to, $—NO_2$, —C(═O)—, $—CO_2R_1$, $—SO_2—$, —CHO, —CN, and $—CONR_2$, and the like, wherein $R_1$ and $R_2$ each independently represent an alkyl group. In some embodiments, the nucleophilic carbanion is derived from an acidic proton C—H in activated methylene or methine group.

The term "carbon-carbon double bond" in the context of "a reactive acceptor", refers to a structure containing a carbon-carbon double bond in its molecule, excluding a benzene ring. Examples of a carbon-carbon double bond include, but are not limited to, —C═C—C═C—, —C═C—C≡C—, —C═C—CHO, —C═C—CO—, —C═CC(O)O—, —C═C—CN.

The term "primary agent" in the context of "Michael addition-curable composition", refers to the combination of all components present in the Michael addition-curable composition except for solvents (including diluents) and catalysts. In some embodiments the amount of the hardness improver, the reactive donor and the reactive acceptor, and other components except for the catalyst and solvent is relative to the total weight of the primary agent in the Michael addition curable composition while the amounts of catalyst and solvent are all expressed in additional parts by weight based on 100 parts by weight of the primary agent.

The term "main surface", when used in the context of a substrate, refers to a surface formed by lengthwise and widthwise dimensions of the substrate for providing decoration.

The term "on", when used in the context of a coating composition applied on a main surface of substrate, includes the coating composition applied directly or indirectly to the main surface of substrate. In some embodiments, the coating composition described herein is applied directly to a main surface of substrate to form a coating. In some embodiments, there be one or more barrier layers or adhesion promoting layers between the coating composition described herein and substrate.

The term "comprises", "comprising", "contains" and variations thereof do not have a limiting meaning where these terms appear in the description and claims.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of what is described herein.

DETAILED DESCRIPTION

The present embodiments in one aspect disclose a Michael Addition curable composition, comprising:

A) at least one reactive donor capable of providing two or more nucleophilic carbanions;

B) at least one reactive acceptor comprising two or more carbon-carbon double bonds; and C) at least one catalyst for catalyzing the Michael Addition crosslinking reaction between the at least one reactive donor and the at least one reactive acceptor; and D) at least one hardness improver, wherein the at least one reactive donor has a backbone based on an epoxy resin;

wherein the at least one hardness improver is one or more selected from silica and urea formaldehyde resin, wherein the hardness improver has a particle size in micrometers, and wherein the at least one hardness improver has a pH value of 6.5 or higher.

Reactive Donor

According to embodiments, the Michael Addition curable composition comprises at least one reactive donor capable of providing two or more nucleophilic carbanions. As described above, the nucleophilic carbanion refers to an active intermediate of carbon with a lone pair of electrons to which two or three strong electronegative groups are typically attached. As an example of the strong electronegative groups, it may be selected from one or more of the following $—NO_2$, —C(═O)—, $—CO_2R_1$, $—SO_2—$, —CHO, —CN, and $—CONR_2$, and the like, wherein $R_1$ and $R_2$ each independently represent an alkyl group.

According to an embodiment, the nucleophilic carbanion of the at least one reactive donor is derived from an acidic proton C—H in activated methylene or methine group. Suitable examples capable of providing above acidic proton C—H comprise, without limitation, dialkyl malonates (e.g., dimethyl malonate, diethyl malonate, and the like), cyanoacetates (e.g., methyl cyanoacetate, ethyl cyanoacetate, and the like), acetoacetates, propionyl acetates, acetylacetone, dipropionyl methane and the like, and mixture or combination thereof.

According to some embodiments, the at least one reactive donor may be obtained by reacting a compound, oligomer or polymer that may be functionalized to act as a reactive donor backbone with an acetoacetate or malonate compound.

In some embodiments, the reactive donor may comprise at least one reactive donor having a backbone based on epoxy resin. In the embodiment, suitable epoxy resins that can be functionalized to act as a reactive donor include, but are not limited to, one or more of bisphenol A epoxy resin, bisphenol F epoxy resin, bisphenol S epoxy resin, novolac epoxy resin, its mixture and its combination. The epoxy resin can be functionalized by, for example, reacting with diketene, transesterifying with an alkyl acetoacetate or dialkyl malonate, esterficiation with malonic acid or a monoester or acid functional malonate polyester and the like. In a preferred embodiment, the reactive donor is obtained by transesterification of epoxy resin with an alkyl acetoacetate or dialkyl malonate, wherein the malonate or acetoacetate functional group is present in the main chain, as a pendent chain, or present as both, preferably present as a pendent chain.

According to some embodiments, the epoxy equivalent weight of the reactive donor is set in a specific range. It has been surprisingly discovered that the epoxy equivalent weight of the reactive donor is directly related to the VOC of the coating composition, which was not realized prior to the present application. Without being bound by any theory, the reason may be that the epoxy equivalent weight is related to viscosity of epoxy resin, and a higher epoxy equivalent weight corresponds to a higher resin viscosity. Therefore, an epoxy resin with a lower epoxy equivalent can form a film with the aids of a smaller amount of solvent well, and thus less VOC is emitted. According to an embodiment, the epoxy equivalent weight of the reactive donor is in the range of 400-1100 g/mol, preferably in the range of 470-1000 g/mol, more preferably in the range of 470-900 g/mol, and still more preferably in the range of 560-885 g/mol.

According to an embodiment, the at least one reactive donor has a relatively high glass transition temperature. It has also been found that increasing glass transition temperature of the at least one reactive donor is beneficial for increasing hardness of the cured coating. In one embodiment, the at least one reactive donor has a glass transition temperature of 25° C. or higher. However, considering practical applications, the glass transition temperature of the at least one reactive donor should not be too high, otherwise it will negatively affect the curing of the coating and cause unnecessary VOC emissions. Therefore, the at least one reactive donor preferably has a glass transition temperature in the range of 25° C. to 40° C.

In some embodiments, based on the total weight of the primary agent in the Michael Addition curable composition, the amount of the at least one reactive donor can be varied within a wide range, and the at least one reactive donor is preferably present in an amount of 30-75% by weight, more preferably present in an amount of 32-70% by weight, and still more preferably present in an amount of 35-65% by weight.

Reactive Acceptor

According to an embodiment, the Michael Addition curable composition comprises at least one reactive acceptor containing a carbon-carbon double bond. In many embodiments, the at least one reactive acceptor has two or more carbon-carbon double bonds, preferably two carbon-carbon double bonds.

According to an embodiment, the carbon-carbon double bond group contained in the at least one reactive acceptor has a structure represented by the following formula II:

C═C—CX (Formula II)

in which, CX represents any one of alkenyl group, alkynyl group, aldehyde group (—CHO), ketone group (—CO—), ester group (—C(O)O—) and cyano group (—CN). Preferably, the carbon-carbon double bond group is derived from one or more of α, β-unsaturated aldehyde, α, β-unsaturated ketone, α, β-unsaturated carboxylate ester and α, β-unsaturated nitrile, preferably from α, β-unsaturated carboxylate esters.

In one embodiment, the at least one reactive acceptor may be selected from one or more of α, β-unsaturated carboxylate esters represented by the following formula:

(Formula A)

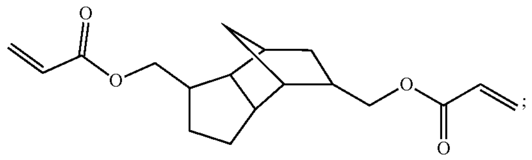

(Formula B)

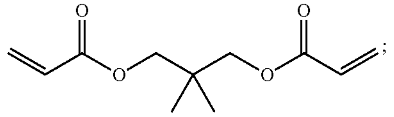

(Formula C)

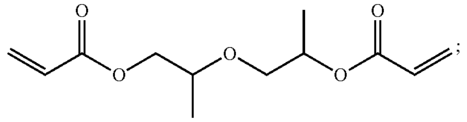

(Formula D)

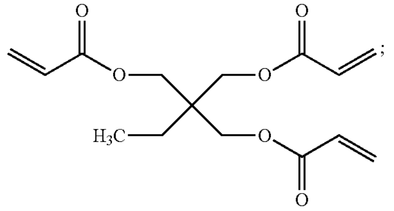

(Formula E)

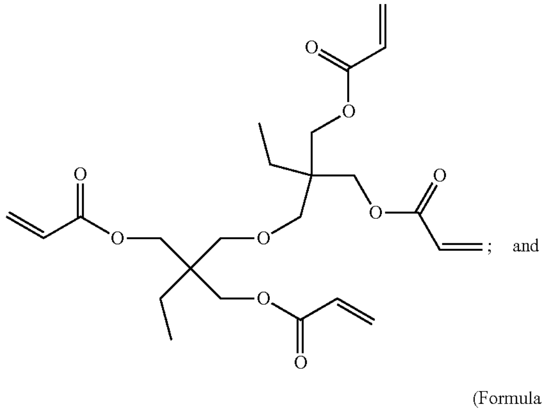

and (Formula F)

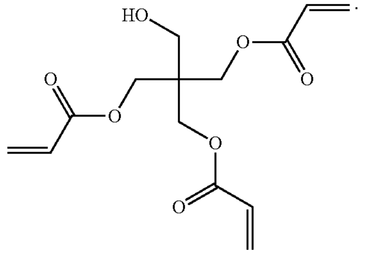

In a preferred embodiment, the at least one reactive acceptor may be selected from one or more of the α, β-unsaturated carboxylate esters represented by Formula A, Formula B and Formula C.

The amount of the at least one reactive acceptor can be varied within a wide range, preferably based on the total weight of the primary agent in the Michael Addition curable composition, the at least one reactive acceptor is present in an amount of 10-35% by weight, more preferably in an amount of 15-30% by weight, still more preferably in an amount of 18 to 28% by weight.

In the Michael Addition curable composition described herein, in addition to the at least one reactive donor and at least one reactive acceptor described herein, the composition also comprises resins that do not participate in Michael Addition reaction, including but not limited to polyester resin, acrylics resin, epoxy resin, polyurethane resin, and the like. The amount of these resins can be added as needed and determined empirically.

Hardness Improver

In one embodiment, the Michael addition curable composition includes at least one hardness improver. As described above, the at least one hardness improver is a filler added to the composition to increase hardness of the resulting coating formed therefrom. In an embodiment, the at least one hardness improver is one or more selected from silica and urea formaldehyde resin.

As well known, silica and urea-formaldehyde resin are commonly used matting agents suitable for reducing surface gloss of coatings, and their applications in matte coating compositions are very extensive. However, it has been surprisingly discovered that silica and urea-formaldehyde resin in a Michael addition-curable composition function significantly different from that they do in other curing systems, such as solvent-borne two-component polyurethane coating compositions. In the Michael addition-curable system, silica and urea-formaldehyde resin did not show a significant matting effect. That it, the gloss of the coating was not significantly reduced due to its presence, but its presence can significantly improve the hardness of the Michael addition curable system based on an epoxy resin, which was unpredictable prior to the present application.

It has also been discovered that the particle size of silica and urea-formaldehyde resin as a hardness improver is a factor affecting their application as a hardness improver. When used as a filler in a coating composition, the hardness improver should have an appropriate particle size. If the size of the particle is too small, the particle is equivalent to a sharp point, and would readily form a stress concentration in coatings, which is not conducive to the improvement of the toughness and hardness of the coating; if the size of the particle is too large, the particle would readily separate from the resin system and from a two-phase structure, which is also not conducive to the improvement of coating toughness and hardness. In an embodiment, the particles of the hardness improver are micron-sized.

In many embodiments, at least one hardness modifier has a particle size in micrometers. As described herein, the term "micrometer" may be used interchangeably with the term "micron" or "μm." In many embodiments, at least one hardness modifier has a particle size in micrometers in the range of 3 to 50 microns, preferably in the range of 3 to 20 microns, more preferably in the range of 3 to 10 microns, even more preferably in the range of 3 to 8 microns. In one embodiment, the particle size of the hardness improver is in the range of 3 to 50 microns. In some embodiments, the particle size of the at least one hardness improver is in the range of 3 to 20 microns. In some more embodiments, the particle size of the hardness improver is in the range of at least one 3 to 10 microns. In some still more preferred embodiment, the particle size of the at least one hardness improver is in the range of 3 to 8 microns. It was reported that the addition of nano-sized materials to polymers can strengthen and toughen the polymers, and increase its glass transition temperature in which nano-silica is a commonly used nano-material for resin reinforcement and toughness. However, in an embodiment, it has been surprisingly found that, compared with silica with a particle size within the above range, nano-sized silica cannot improve the coating hardness of the epoxy-based Michael addition curing system, which is unpredictable.

It has also been discovered that the pH value of silica and urea-formaldehyde resin as a hardness improver is another important factor of affecting their application as hardness improvers. In an embodiment, the at least one hardness improver added to the Michael addition curing system is neutral or alkaline, and such a hardness improver can significantly increase the hardness of the coating compared with acidic silica. Without being bound by any theory, it is speculated that the addition of neutral or alkaline hardness improvers is advantageous mainly because the reaction of the Michael addition curing system itself occurs in the presence of alkaline catalysts, so that the addition of acidic substances will reduce the catalytic activity of the alkaline catalyst, resulting in a decrease in the drying and curing performance of the coating, and then negatively affecting the hardness of the coating.

In some embodiments, the pH of the at least one hardness improver is in the range of 6.5 to 10.5. In some preferred embodiments, the pH of the at least one hardness improver is in the range of 6.7 to 9.5.

In an embodiment wherein silica is used as a hardness improver, the silica is selected from amorphous silica, precipitated silica, or a combination thereof. In some embodiments, the silica is pretreated with an organic substance, preferably with polymer wax or silane, and more preferably, the silica is pretreated with aminosilane. As an example of silica, any commercially available silica can be used.

In an embodiment wherein urea-formaldehyde is used as a hardness improver, any commercially available urea-formaldehyde can be used.

In one embodiment, the amount of the at least one hardness improver used herein can be adjusted as needed. The amount of the at least one hardness improver can be varied within a wide range. Preferably, the at least one hardness improver is present in an amount of 4-10% by weight based on the total weight of the primary agent in the Michael addition curing composition, more preferably in an amount of 6-10% by weight.

Catalyst

In addition to the above components, the composition described herein also comprises at least one catalyst for catalyzing the Michael Addition crosslinking reaction of the at least one reactive acceptor and at least one reactive donor.

In some embodiments, the at least one catalyst is a latent base catalyst.

In an embodiment, the latent base catalyst described herein is a substituted carbonate salt having the structure of formula (II):

(I)

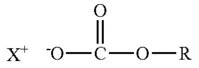

In Formula (II):

$X^+$ is a non-acidic cation. Suitable examples include, without limitation, alkali metal ion, alkali-earth metal ion, ammonium ion, phosphonium ion, and the like. Preferably, $X^+$ is a lithium, sodium, or potassium ion, and the like. More preferably, $X^+$ is a quaternary ammonium ion or a phosphonium ion;

R is H, optionally substituted C1-C10 alkyl, C6-C12 aryl, C7-C14 aralkyl or combinations thereof. Preferably, R is an unsubstituted alkyl group having 1 to 4 carbon atoms. If the R group is substituted, the substituents are selected so as to not substantially interfere with the crosslinking reaction. In order to avoid interference with the action of the base catalyst, acidic substituents, such as for example, carboxylic acid substituents are present in only insubstantial amounts, or absent altogether.

In an embodiment, the latent base catalyst described herein is a compound with the general structure shown in Formula (II) , wherein the cation $X^+$is linked with the carbonate group of Formula (II) in a single molecule, i.e. the latent base catalyst has the general structure shown in Formula (II-1):

(Formula II-1)

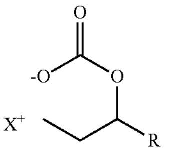

in the formula (II-1), R and $X^+$ are defined as above.

In another embodiment, the latent base catalyst described herein is a compound of the general structure shown in Formula (II), wherein the group R is a polymer, and/or the cation $X^+$ is a quaternary ammonium ion or a phosphonium ion.

In a preferred embodiment, the latent base catalyst described herein is preferably a quaternary alkyl ammonium carbonate. Suitable examples include, without limitation, tetrahexylammonium methyl carbonate, tetradecyl-trihexylammonium-methyl carbonate, tetradecylammonium methyl carbonate, tetrabutylammonium methylcarbonate, tetrabutylammonium ethylcarbonate, benzyltrimethylammonium methyl carbonate, or trihexylmethylammonium methyl carbonate or trioctylmethylammonium methyl carbonate, and mixtures or combinations thereof. Preferably, the latent base catalyst described herein include tetrabutylammonium alkylcarbonate In an embodiment, the amount of latent base catalyst used herein may vary depending on the properties of the coating composition. Preferably, the composition includes about 0.001 to 1 meq catalyst per gram of resin solids, more preferably 0.02 to 0.07 meq per gram of resin solids. Latent catalysts of this type are known in the art and are commercially available.

Without limiting to theory, it is believed that the latent base catalyst of Formula (II) functions by releasing carbon dioxide when the carbonate salt decomposes. This produces a strong base, i.e. a hydroxide, an alkoxy, or an aralkyloxy base. In a closed pot, this reaction takes place slowly, allowing for extended pot life. When the coating is applied and surface area increases, the base is regenerated quickly as carbon dioxide escapes from the surface, allowing for faster cure (i.e. drying and hardness development) of the coating. Accordingly, the use of a latent base catalyst of Formula (II) allows for optimal potlife, open time, and cure performance for the crosslinkable coating compositions described herein.

In another embodiment, the at least one catalyst may also include conventional catalysts (i.e., non-latent catalysts) known to those skilled in the art that are different from the above-mentioned latent base catalysts, which may be used alone or in combination with the latent base catalyst described herein to accelerate the Michael addition reaction.

Examples of suitable non-latent catalysts include, without limitation, tetrabutyl ammonium hydroxide (TBAH), ammonium hydroxide, DBU (8-Diazabicyclo[5.4.0]undec-7-ene), DBN (1,5-Diazabicyclo[4.3,0]non-5-ene), and TMG (1,1,3 ,3-tetramethylguanidine).

Suitable additional examples of non-latent catalysts include, without limitation, salts of cations including non-acidic cations such as K+, Na+, Li+, or weakly acidic cations such as, for example, protonated species of strong organic bases such as, for example, DBU, DBN, TMG or TBAH and the like, paired with a basic anion $X^-$from an acidic X—Hgroup-containing compound, where X comprises N, P, O, S, C or Cl. Suitable examples of such non-latent catalyst may be tetrabutyl ammonium fluoride.

In one embodiment, the amount of at least one catalyst used herein may vary depending on the nature of the composition. Preferably, the at least one catalyst is present in an amount of 1.0 part by weight or more, preferably 1.4 parts by weight or more and not more than 10 parts by weight, preferably no more than 8 parts by weight and more preferably no more than 5 parts by weight, based on the solid amount of the at least one catalyst relative to 100 parts by weight of the primary agent of the Michael Addition-curable composition.

Other Components

The Michael Addition-curable composition according to an embodiment may further comprise one or more solvents in order to adjust viscosity of the composition to obtain the desired processability.

In certain embodiments, the solvent comprises one or more of alcohols, such as methanol, isopropanol, isobutanol, n-propanol, n-butanol, 2-butanol, pentanol, tert-amyl alcohol, neopentyl alcohol, n-hexanol, ethylene glycol, and the like; esters such as ethyl acetate, butyl acetate, methoxypropyl acetate, isobutyl acetate, propylene glycol methyl ether acetate and the like; ketones such as methyl ethyl ketone, methyl n-amyl ketone, and the like; ethers such as ethylene glycol butyl ether, and the like; aliphatic solvents such as solvent oils, and the like; and aromatic and/or alkylated aromatic solvents such as toluene, xylene, and the like. Other solvents are also contemplated.

In a specific embodiment, the one or more solvents includes butyl acetate, isopropanol, propylene glycol methyl ether acetate, and combinations thereof.

In an embodiment, the weight percentage of one or more solvents may each vary within a wide range. Relative to 100 parts by weight of the primary agent in the Michael addition curable composition, the amount of one or more solvents preferably varies in the range of 0.1 parts by weight to 35 parts by weight, more preferably 10 parts by weight to 30 parts by weight, still more preferably in the range of 15 parts by weight to 30 parts by weight, and even more preferably in the range of 20 parts by weight to 28 parts by weight.

In an embodiment, the composition described herein may optionally further comprise other additional additives commonly used in the composition, which additives do not adversely affect the composition or cured product obtained therefrom. Suitable additives comprise, for example, those that improve processing or manufacturing properties of the composition, enhance aesthetics of the composition or cured product obtained therefrom, or improve specific functional properties or characteristics of the composition or cured product obtained therefrom (such as adhesion to the substrate). The additives that may be included are, for example, selected from adhesion promoters, curing accelerators, open time regulators, pigments and fillers, surfactants, lubricants, defoamers, dispersants, UV absorbers, colorants, coalescing agents, thixotropic agents, antioxidants, stabilizers, preservatives, fungicides, or combinations thereof for providing the required performance as needed. The content of each optional ingredient is preferably sufficient to achieve its intended purpose, but does not adversely affect the composition or cured product obtained therefrom.

Curing

According to embodiments, after components of the composition described herein are mixed, the resulting mixture has a relatively long pot life and shows particularly excellent workability. In one embodiment, after components of the composition are mixed, the resulting mixture has a pot life of 6 hours or more, preferably of 7 hours or more, and more preferably of 8 hours or more, and even more preferably of 10 hours or more at 25° C.

The Michael Addition-curable composition described herein can be cured at an appropriate temperature according to needs, for example, materials of coated substrate. In some embodiments, curing is performed at room temperature, especially within a range of 20-40° C. and preferably within a range of 25-35° C. In other embodiments, it can be cured under high temperature baking conditions, such as above 100° C.

The Michael Addition curable composition can be cured for an appropriate period of time, which depends on curing temperature. At room temperature, the curing can be completed within 7 days or less, preferably 5 days or less, more preferably 3 days or less.

In one embodiment, after components of the composition are mixed, the resulting composition is applied at a wet coating thickness of about 150 microns and dried at room temperature for 4 days, the resulting cured coating shows a significantly higher pencil hardness. The resulting pencil hardness can reach F-H levels, preferably H-2H levels. The "pencil hardness" in this application is measured according to GB/T 6739-1996 "Pencil Hardness Measurement of Coating Film".

The Michael Addition curable compositions according to the embodiments described herein are suitable for a variety of applications, and can be used for manufacture of coatings, adhesives, sealants, foams, elastomers, films, molded articles, or inks.

Prior to use, the Michael Addition-curable composition according to embodiments described herein may be stored in various ways. In certain embodiments, components of the Michael Addition curable composition, such as at least one reactive donor, at least one reactive acceptor, and at least one catalyst, are stored separately. In other embodiments, certain components of the Michael Addition curable composition may be pre-mixed, for example, at least one reactive donor, at least one reactive acceptor and at least one hardness improver may be pre-mixed, and at least one catalyst may be stored separately, or at least one catalyst may be pre-mixed with at least one reactive donor or at least one reactive acceptor, and the remaining component is stored separately. Upon using, at least one reactive donor, at least one reactive acceptor, at least one hardness improver, at least one catalyst and other components are simply mixed in a mixing vessel at a predetermined weight ratio. The mixed curable composition can be shaped using various methods familiar to those skilled in the art, such as by molding, coating, extrusion, and the like. The composition thus obtained can be cured to form a desired cured product. Therefore, what is described herein also relates to a cured product obtained and/or obtainable by the Michael Addition curable composition described herein.

Coating Composition

The Michael Addition curable composition described herein is particularly suitable for application of a coating composition in coating industry. Therefore, what is described herein in still another aspect relates to a coating composition, comprising the Michael Addition curable composition described herein. In an embodiment in which the Michael Addition curable composition described herein is used as a coating composition, the composition can be applied in a variety of ways that are familiar to those skilled in the art, including spraying (e.g., air assisted, airless or electrostatic spraying), brushing, rolling, flooding and dipping. In an embodiment, the mixed coating composition is coated by spraying. The coating composition can be applied in various wet film thickness. In an embodiment, the coating composition is applied in such a wet film thickness in the range of about 100 to about 400 μm, preferably in the range of about 100 to 200 μm. The applied coating may be cured by air drying at room temperature or by accelerating drying with various drying devices e.g., ovens that are familiar to those skilled in the art.

Coated Articles

In another aspect provided, a coated article comprising a substrate having at least one major surface; and a cured coating formed from the coating composition described herein that is directly or indirectly applied on the major surface.

According to some embodiments, the substrate has at least one, preferably two, major surfaces that are opposite one another. As used herein, "major surface" is a surface defined by the lengthwise and widthwise dimensions of the substrate for providing decoration. Preferably, the major surface of substrate may contain polar groups such as hydroxyl groups, amino groups, mercapto groups, and the like for promoting adhesion. The hydroxyl group on the surface of substrate may be originated from the substrate itself, such as from cellulose when the substrate is a wooden substrate or may be introduced on the surface of substrate by performing surface treatment on the major surface of substrate, for example, by corona treatment.

In many embodiments, the coating composition described herein may be at least partially applied on a variety of substrates. Suitable examples include, without limitation, natural and engineered buildings and building materials, freight containers, flooring materials, walls, furniture, other building materials, motor vehicles, motor vehicle components, aircraft components, trucks, rail cars and engines, bridges, water towers, cell phone tower, wind towers, radio towers, lighting fixtures, statues, billboard supports, fences, guard rails, tunnels, pipes, marine components, machinery components, laminates, equipment components, appliances, and packaging. Exemplary substrates include, without limitation, wood, wood composite, metal, plastic, paper, fabric, ceramic, cementitious board or any combination thereof.

The following examples describe what is disclosed herein in more detail, which are for illustrative purposes only, since various modifications and changes will be apparent to those skilled in the art from the scope. Unless otherwise indicated, all parts, percentages, and ratios reported in the following examples are on a weight basis and all reagents used in the examples are commercially available and may be used without further treatment.

EXAMPLES

Test Method

Pencil hardness: After applying the coating composition on a wooden board at a wet film thickness of 150 microns and air drying for 4 days, the pencil hardness of the cured coating was measured according to GB/T 6739-1996 "Pencil Hardness Measurement of Coating Film".

Gloss: After applying the coating composition on a wood board at a wet film thickness of 150 microns and air-drying for 4 days, the 60° gloss of the sample was tested using the BYK4565 miniature BYK gloss meter.

Reactive Donor

Reactive donor A1: is an epoxy-based reactive donor, which was prepared in the following manner. At room temperature, a four-necked flask equipped with a thermometer, a top stirrer, a gas inlet and a distillation device was charged with 209.36 g of epoxy resin (EEW: 772 g/mol) and 90.64 g of tert-butyl acetoacetate (t-BAA). $N_2$ gas was supplied through the gas inlet for providing $N_2$ protection. Then, the resulting reaction mixture was slowly heated to about 130° C., collected distillate (tert-butanol) and maintained at this temperature until the distillation temperature did not exceed 78° C. Under this distillation temperature<=78° C., the temperature of mixture was raised to 160° C. When the temperature of mixture reached 160° C., it was kept for a while until the distillation temperature was below 60° C. The mixture was then cooled to below 100° C. and then mixed with 102.96 g of n-butyl acetate (n-BA) with a solids content of about 70%.

Reactive donor A2: polyester reactive donor, specifically a malonate functional polyester resin with succinimide.

Reactive Acceptor

Reactive acceptor B1: dipropylene glycol diacrylate (DPGDA).

Reactive acceptor B2: acid-free tri-functional polyester acrylate (TMPTA).

Catalyst

Catalysts C1: blocked catalyst with a strong base which is blocked with di-ethyl carbonate.

Hardness Improver

Various materials listed in Table 1 below were used as hardness improvers.

TABLE 1

| No. | Type | Particle size/μm | pH |
|---|---|---|---|
| D1 | Amorphous silica, pretreated with wax | 5.5 | 6.72 |
| D2 | Precipitated silica, pretreated with silane | 6.3 | 6.93 |
| D3 | Amorphous silica, pretreated with silane | 5.3 | 4.78 |
| D4 | Silica, pretreated with silane | 4.0 | 8.02 |
| D5 | Urea formaldehyde resin | 5-7 | 8-9.5 |
| D6 | Urea formaldehyde resin | 3.5-6.0 | 8-9.5 |
| D7 | Amorphous silica, pretreated with wax | 6.0 | 4.03 |
| D8 | Amorphous silica | 5.0 | 3.86 |
| D9 | Amorphous silica, pretreated with silane | 5.5 | 4.22 |
| D10 | Precipitated silica, pretreated with wax | 6.5 | 6.24 |
| D11 | Nano silica | 0.4-0.5 | 7.5 |

Effect of Hardness Improver on the Coating Hardness

The examples in this section examine the effect of hardness improver on the coating hardness.

The Michael Addition curable compositions of Examples 1-1 to 1-6 and Comparative Examples 1-1 to 1-5 were formulated using a reactive donor A1, a reactive acceptor B1, a catalyst C1, a hardness improver and a solvent, wherein relative to 100 parts by weight of the primary agent of the Michael addition curable resin composition (consisting of the remaining components except for the catalyst and solvent), the amount of catalyst C1 was 4.14 parts by weight, and the amount of solvent was 22.9 parts by weight in which the solvent was formulated from 6 parts by weight of isopropanol, 6 parts by weight of propylene glycol monomethyl ether acetate and 10.9 parts by weight of butyl acetate. In the Examples 1-1 to 1-6 and Comparative Examples 1-1 to 1-5, relative to the total weight of the primary agent of the Michael addition curable resin composition, the reactive donor A1, the reactive acceptor B1 and the hardness improver were present in a weight percentage of 62.4% by weight, 23.1% by weight and 6.0% by weight, respectively. After mixing the reactive donor, the reactive acceptor, the catalyst, and the hardness improver, a certain amount of solvent was added to adjust viscosity of composition, thereby forming the Michael Addition-curable compositions of Examples 1-1 to 1-6 and Comparative Examples 1-1 to 1-5.

As a control, Comparative Example A was the same as the above-mentioned Examples and Comparative Examples, with the exception that no hardness improver was added.

The compositions prepared in the Examples and Comparative Examples shown in Table 2 below were applied to a test substrate at a wet coating thickness of 150 microns, and cured at room temperature for 4 days. Afterwards, the resulting cured coating was measured according to GB/T 6739-1996 "Pencil Hardness Measurement of Coating Film" for its pencil hardness. The results were summarized in table 2.

TABLE 2

| | Reactive donor | Reactive acceptor | Catalyst | Hardness improver | Pencil hardness |
|---|---|---|---|---|---|
| Example 1-1 | A1 | B1 | C1 | D1 | H |
| Example 1-2 | A1 | B1 | C1 | D2 | H |
| Example 1-3 | A1 | B1 | C1 | D3 | H |
| Example 1-4 | A1 | B1 | C1 | D4 | H |
| Example 1-5 | A1 | B1 | C1 | D5 | F |
| Example 1-6 | A1 | B1 | C1 | D6 | F |
| CExample 1-1 | A1 | B1 | C1 | D7 | HB |
| CExample 1-2 | A1 | B1 | C1 | D8 | HB |
| CExample 1-3 | A1 | B1 | C1 | D9 | HB |
| CExample 1-4 | A1 | B1 | C1 | D10 | HB |
| CExample 1-5 | A1 | B1 | C1 | D11 | HB |
| Control A | A1 | B1 | C1 | — | HB |

As shown by the hardness results in Table 2, using silica or urea-formaldehyde resin having a specific particle size (specifically in micrometer) and a specific pH value (specifically 6.5 or higher) as a hardness improver can significantly improve the coating hardness of the Michael addition-curable composition formulated therefrom. In contrast, silica or urea-formaldehyde with a nanometer scale or a pH lower than 6.5 was not suitable as a hardness improver and cannot improve the coating hardness.

Effect of the Amount of Hardness Improver on the Coating Hardness

The Michael Addition curable compositions of Examples 1-2-1, 1-2, 1-2-2 and 1-2-3 were formulated using a reactive donor A1, a reactive acceptor B1, a catalyst C1, a hardness improver D2 and a solvent, wherein relative to 100 parts by weight of the primary agent of the Michael addition curable resin composition (consisting of the remaining components except for the catalyst and solvent), the amount of catalyst C1 was 4.14 parts by weight, and the amount of solvent was 22.9 parts by weight in which the solvent was formulated from 6 parts by weight of isopropanol, 6 parts by weight of propylene glycol monomethyl ether acetate and 10.9 parts by weight of butyl acetate. In the Examples 1-2-1, 1-2, 1-2-2 and 1-2-3, relative to the total weight of the primary agent of the Michael addition curable resin composition, the reactive donor A1, and the reactive acceptor B1 were present in a weight percentage of 62.4% by weight and 23.1% by weight and the hardness improver was present in a weight percentage as shown in table 3. After mixing the reactive donor, the reactive acceptor, the catalyst, and the hardness improver, a certain amount of solvent was selectively added to adjust viscosity of composition, thereby forming the Michael Addition-curable compositions of Examples 1-2-1, 1-2, 1-2-2 and 1-2-3.

TABLE 3

| | Reactive donor | Reactive acceptor | Catalyst | Hardness improver/weight percentage | Pencil hardness | 60° gloss |
|---|---|---|---|---|---|---|
| Control A | A1 | B1 | C1 | — | HB | 96.4 |
| Example 1-2-1 | A1 | B1 | C1 | D2/4% | F | 94.4 |
| Example 1-2 | A1 | B1 | C1 | D2/6% | H | 92.1 |
| Example 1-2-2 | A1 | B1 | C1 | D2/8% | H | 86.7 |
| Example 1-2-3 | A1 | B1 | C1 | D2/10% | H | 80.5 |

As shown by the hardness results in Table 3, the hardness improver described herein significantly improved coating hardness of the Michael addition curable composition formulated therefrom. Upon adding 6 wt % to 10 wt % of the hardness improver, the resulting coatings exhibited improved hardness by two or more levels compared with the control sample A without any hardness improver, and gloss of the coatings did not change obviously.

Effect of Hardness Improver on Coating Hardness of Polyester-Based Michael Addition Curable System The examples in this section examine the effect of using hardness improvers in the polyester-based Michael addition curable system.

The polyester-based Michael Addition curable compositions of Comparative Examples 2-1-0 to 2-2-2 were formulated using a reactive donor A2, a reactive acceptor B1 or B2, a catalyst C1, a hardness improver D2 or D3 and a solvent, wherein relative to 100 parts by weight of the primary agent of the Michael addition curable resin composition (consisting of the remaining components except for the catalyst and solvent), the amount of catalyst C1 was 4.14 parts by weight, and the amount of solvent was 20.8 parts by weight in which the solvent was formulated from 6 parts by weight of isopropanol, 6 parts by weight of propylene glycol monomethyl ether acetate and 8.8 parts by weight of butyl acetate. In the Comparative Examples 2-1-0 to 2-2-2, the weight percentage of the reactive donor, reactive acceptor, and hardness improver were listed in Table 4. After mixing the reactive donor, the reactive acceptor, the catalyst, and the hardness improver, a certain amount of solvent was added to adjust viscosity of composition, thereby forming the Michael Addition-curable compositions of Comparative Examples 2-1-0 to 2-2-2.

The compositions prepared in the Comparative Examples shown in Table 4 below were applied to a test substrate at a wet coating thickness of 150 microns, and cured at room temperature for 4 days. Afterwards, the resulting cured coating was measured according to GB/T 6739-1996 "Pencil Hardness Measurement of Coating Film" for its pencil hardness.

The results were summarized in table 4.

TABLE 4

| | Reactive donor/weight percentage | Reactive receptor/weight percentage | catalyst | Hardness improver/weight percentage | Pencil hardness |
|---|---|---|---|---|---|
| Control 2-1-0 | A2/59.7% | B2/27.9% | C1 | — | HB |
| CExample 2-1-1 | A2/59.7% | B2/27.9% | C1 | D2/10% | B |
| CExample 2-1-2 | A2/59.7% | B2/27.9% | C1 | D3/10% | 2B |
| Control 2-2-0 | A2/56.3% | B1/31.3% | C1 | — | B |
| CExample 2-2-1 | A2/56.3% | B1/31.3% | C1 | D2/10% | 2B |
| CExample 2-2-2 | A2/56.3% | B1/31.3% | C1 | D3/10% | 3B |

As shown by the hardness results in Table 4, the hardness improver will not increase the coating hardness of the polyester resin-based Michael addition curing system. On the contrary, the presence of the hardness improver produced negative effects.

In addition, comparing the hardness results of the various examples in Table 4 above and Examples 1-2-3 in Table 3 above, it has been found that the hardness improver described herein had special selectivity for the Michael curing system, which was especially suitable for improving the coating hardness of epoxy-based Michael curable systems.

The Effect of Hardness Improver on the Coating Hardness of Solvent-Based Two-Component Polyurethane Curing System The examples in this section examined the effect of using hardness improvers in a solvent-based two-component polyurethane curing system.

Relative to the total weight of the resin system, the hardness improver D2 was added to 100 parts by weight of the solvent-based two-component polyurethane curing system at 4%, 6%, 8%, and 10% by weight. Afterward, the coating hardness and gloss of the resulting coating were determined. The test results were listed in Table 5 below.

TABLE 5

| | Hardness improver | Amount/wt % | Pencil hardness | 60° Gloss |
|---|---|---|---|---|
| Control B | — | — | HB | 100.9 |
| CExample 3-1 | D2 | 4% | HB | 89.0 |
| CExample 3-2 | D2 | 6% | HB | 78.6 |
| CExample 3-3 | D2 | 8% | HB | 68.6 |
| CExample 3-4 | D2 | 10% | HB | 65.5 |

EMBODIMENTS

Embodiment 1: A Michael Addition curable composition, comprising: A) at least one reactive donor capable of providing two or more nucleophilic carbanions; B) at least one reactive acceptor comprising two or more carbon-carbon double bonds; and C) at least one catalyst for catalyzing the Michael Addition crosslinking reaction between the at least one reactive donor and the at least one reactive acceptor; and D) at least one hardness improver, wherein the at least one reactive donor has a backbone based on an epoxy resin; wherein the at least one hardness modifier is one or more selected from silica and urea formaldehyde resin, wherein the at least one hardness modifier has a particle size in micrometers; and wherein the at least one hardness modifier has a pH value of 6.5 or higher.

Embodiment 2: An embodiment of Embodiment 1, wherein the at least one reactive donor has an epoxy equivalent in the range of 400-1100 g/mol, preferably in the range of 470-1000 g/mol, more preferably in the range of 470-900 g/mol.

Embodiment 3: An embodiment of any of Embodiments 1 or 2, wherein the at least one reactive donor has a backbone derived from one or more of bisphenol A epoxy resin, bisphenol F epoxy resin, bisphenol S epoxy resin, Novolac epoxy resin, its mixture and combination.

Embodiment 4: An embodiment of any of Embodiments 1 to 3, wherein the at least one hardness modifier has a particle size in micrometers in the range of 3 to 50 microns, preferably in the range of 3 to 20 microns, more preferably in the range of 3 to 10 microns, even more preferably in the range of 3 to 8 microns.

Embodiment 5: An embodiment of any of Embodiments 1 to 4, wherein the at least one hardness modifier has a pH value in the range of 6.5 to 10.5, preferably in the range of 6.7 to 9.5.

Embodiment 6: An embodiment of any of Embodiments 1 to 5, wherein the silica is selected from the group comprising amorphous silica, precipitated silica, or a combination thereof.

Embodiment 7: An embodiment of any of Embodiments 1 to 6, wherein the silica is pretreated with an organic substance, preferably with polymeric wax or silane.

Embodiment 8: An embodiment of any of Embodiments 1 to 7, wherein the at least one hardness modifier is present in an amount of 4-10% by weight, preferably in an amount of 6 to 10% by weight, based on the total weight of the primary composition in the Michael addition curable composition.

Embodiment 9: An embodiment of any of Embodiments 1 to 8, which is used for manufacture of manufacture of coatings, adhesives, sealing agents, foaming materials, films, molded products or inks.

Embodiment 10: A coating composition, comprising the composition according to any one of Embodiments 1 to 9.

Embodiment 11: A coated article comprising: a substrate having at least one major surface; and a cured coating formed from the coating composition of Embodiment 10 that is directly or indirectly applied on the major surface.

Embodiment 12: An embodiment of Embodiment 11, wherein the substrate comprises wood, wood composite, metal, plastic, paper, fabric, ceramic, cementitious board or any combination thereof.

As shown by the hardness results in Table 5, the hardness improver according to the Michael Addition curable composition described herein also will not increase the coating hardness of the polyurethane resin curing system, but it only produced a matting effect.

While what has been described with respect to a number of embodiments and examples, those skilled in the art, having benefit of what is disclosed herein, will appreciate that other embodiments can be devised which do not depart from the scope and spirit of what is disclosed herein.

What is claimed is:

1. A Michael Addition curable composition, comprising:

A) at least one reactive donor capable of providing two or more nucleophilic carbanions;

B) at least one reactive acceptor comprising two or more carbon-carbon double bonds; and C) at least one catalyst for catalyzing the Michael Addition crosslinking reaction between the at least one reactive donor and the at least one reactive acceptor; and D) at least one hardness modifier, wherein the at least one reactive donor has a backbone based on an epoxy resin;

wherein the at least one hardness modifier is one or more selected from silica and urea formaldehyde resin, wherein the at least one hardness modifier has a particle size in micrometers in the range of 3 to 50 microns; and wherein the at least one hardness modifier has a pH value of 6.5 or higher.

2. The Michael Addition curable composition according to claim 1, wherein the at least one reactive donor has an epoxy equivalent in the range of 400-1100 g/mol.

3. The Michael Addition curable composition according to claim 2, wherein the at least one reactive donor has an epoxy equivalent in the range of 470-1000 g/mol.

4. The Michael Addition curable composition according to claim 2, wherein the at least one reactive donor has an epoxy equivalent in the range of 470-900 g/mol.

5. The Michael addition curable composition according to claim 1, wherein the at least one reactive donor has a backbone derived from one or more of bisphenol A epoxy resin, bisphenol F epoxy resin, bisphenol S epoxy resin, Novolac epoxy resin, its mixture and combination.

6. The Michael Addition curable composition according to claim 1, wherein the at least one hardness modifier has a pH value in the range of 6.5 to 10.5.

7. The Michael addition curable composition according to claim 1, wherein the silica is selected from the group consisting of amorphous silica, precipitated silica, or a combination thereof.

8. The Michael addition curable composition according to claim 1, wherein the silica is pretreated with an organic substance.

9. The Michael addition curable composition according to claim 8, wherein the organic substance comprises polymeric wax or silane.

10. The Michael addition curable composition according to claim 1, wherein the at least one hardness modifier is present in an amount of 4-10% by weight based on the total weight of the primary composition in the Michael addition curable composition.

11. The Michael addition curable composition according to claim 10, wherein the at least one hardness modifier is present in an amount of 6-10% by weight based on the total weight of the primary composition in the Michael addition curable composition.

12. The Michael Addition curable composition according to claim 1, which is used for manufacture of manufacture of coatings, adhesives, sealing agents, foaming materials, films, molded products or inks.

13. A coating composition, comprising the composition according to claim 1.

14. A coated article comprising a substrate having at least one major surface; and a cured coating formed from the coating composition of claim 13 that is directly or indirectly applied on the major surface.

15. The article according to claim 14, wherein the substrate comprises wood, wood composite, metal, plastic, paper, fabric, ceramic, cementitious board or any combination thereof.

16. The Michael Addition curable composition according to claim 1, wherein the at least one hardness modifier has a particle size in micrometers in the range of 3 to 20 microns.

17. The Michael Addition curable composition according to claim 1, wherein the at least one hardness modifier has a particle size in micrometers in the range of 3 to 10 microns.

18. The Michael Addition curable composition according to claim 1, wherein the at least one hardness modifier has a particle size in micrometers in the range of 3 to 8 microns.

19. The Michael Addition curable composition according to claim 1, wherein the at least one hardness modifier has a pH value in the range of 6.7 to 9.5.

* * * * *